(12) United States Patent
Carberry et al.

(10) Patent No.: US 8,291,728 B2
(45) Date of Patent: Oct. 23, 2012

(54) METHOD FOR THE JOINING OF LOW EXPANSION GLASS

(75) Inventors: Joel Patrick Carberry, Elmira Heights, NY (US); Mark Lawrence Powley, Campbell, NY (US); Robert Stephen Wagner, Corning, NY (US)

(73) Assignee: Corning Incorporated, Corning, NY (US)

( * ) Notice: Subject to any disclaimer, the term of this patent is extended or adjusted under 35 U.S.C. 154(b) by 184 days.

(21) Appl. No.: 12/711,726

(22) Filed: Feb. 24, 2010

(65) Prior Publication Data

US 2010/0218556 A1    Sep. 2, 2010

Related U.S. Application Data

(60) Provisional application No. 61/156,052, filed on Feb. 27, 2009.

(51) Int. Cl.
*C03B 23/20* (2006.01)
*C03B 23/207* (2006.01)
*C03B 23/057* (2006.01)

(52) U.S. Cl. ............................. 65/33.2; 65/31

(58) Field of Classification Search ................ 65/36–39, 65/33.2, 33.5
See application file for complete search history.

(56) References Cited

U.S. PATENT DOCUMENTS

| | | | |
|---|---|---|---|
| 3,661,546 A | | 5/1972 | Busdiecker et al. |
| 4,331,383 A | * | 5/1982 | Christiansen ................... 359/848 |
| 4,917,934 A | * | 4/1990 | Sempolinski ................... 428/116 |
| 5,489,321 A | * | 2/1996 | Tracy et al. ....................... 65/43 |
| 6,501,044 B1 | | 12/2002 | Klockhaus et al. |
| 7,040,121 B2 | * | 5/2006 | Canale et al. ..................... 65/34 |
| 7,361,869 B2 | * | 4/2008 | Russegger ..................... 219/543 |
| 7,856,850 B2 | * | 12/2010 | Gille et al. ..................... 65/33.5 |
| 8,146,389 B2 | * | 4/2012 | Huang et al. ..................... 65/392 |
| 2002/0056291 A1 | | 5/2002 | Schultz et al. |
| 2002/0136507 A1 | | 9/2002 | Musk |
| 2004/0045323 A1 | * | 3/2004 | Schultz et al. .................. 65/392 |
| 2004/0207314 A1 | | 10/2004 | Aitken et al. |
| 2004/0247826 A1 | * | 12/2004 | Conzone et al. .............. 428/131 |
| 2005/0014008 A1 | * | 1/2005 | Gille et al. ..................... 428/432 |
| 2007/0014949 A1 | * | 1/2007 | Bhatnagar et al. ........... 428/34.4 |
| 2007/0251927 A1 | * | 11/2007 | Miessbacher et al. ... 219/121.63 |
| 2008/0007830 A1 | * | 1/2008 | Borrelli et al. ................ 359/488 |

FOREIGN PATENT DOCUMENTS

JP                62216932 A  *  9/1987

OTHER PUBLICATIONS

Tamaki, Takayuki et al. "welding of Transparent Materials Using Femtosecond Laser Pulses" Japanese Journal of Applied Physics vol. 44, No. 22 pp. L687-L689 copyright 2005 as viewed at http://jjap.jsap.jp/link?JJAP/44/L687/ on Feb. 8, 2012.*

* cited by examiner

*Primary Examiner* — Matthew Daniels
*Assistant Examiner* — Jodi C Franklin
(74) *Attorney, Agent, or Firm* — Walter M Douglas

(57) ABSTRACT

The invention is directed to a method and apparatus for joining together pieces of low thermal expansion glass to form parts that can be used in the manufacturing of mirror blanks. The parts are then used as a basis for the fabrication, using the method described herein, of hexagon sub-assemblies that would then be joined for assembly into mirror blanks.

6 Claims, 5 Drawing Sheets

METHOD FOR THE JOINING OF LOW EXPANSION GLASS

CROSS-REFERENCE TO RELATED APPLICATIONS

This application claims the benefit of priority under 35 U.S.C. §119(e) of U.S. Provisional Application Ser. No. 61/156,052 filed on Feb. 27, 2009.

FIELD

The invention is directed to a method and apparatus for joining pieces of low thermal expansion glass to form large assemblies or structures. In particular the method and apparatus can be used to make structures for mirrors such as those used in astronomical telescopes and other devices.

BACKGROUND

Glasses having a low coefficient of thermal expansion ("CTE") have applications in many different applications of space technology, astronomy, masks for EUV (extreme ultraviolet) lithography processes, optics, substrates and other uses. In many of these applications it is important to be able to construct large assemblies or structures using low CTE (CTE=$5\times10^{-7}$/° C. or less over the temperature range of $-50°$ C. to $+150°$ C.). Present methods of making large assemblies require fixturing pieces of low CTE glass together and heating the large part assembly in a large furnace environment to the point where the viscosity of the glass is sufficiently low that the glass pieces fuse together at their points of contact. While this method can make large assemblies it is essentially an "all-or-nothing" process." If something goes wrong, for example, a part of the fixture moves or the temperature environment in the furnace is uneven; the entire assembly may be useless and have to be discarded. This is both costly and time consuming. As a result, it is highly desirable to have a method in which an assembly can be constructed from discrete parts. The present invention discloses a method for constructing an assembly from discrete parts which are thermally welded/joined using a laser and an apparatus for use in such method

SUMMARY

The invention is directed to a method and apparatus for joining together pieces of low thermal expansion glass to form parts that can be used in the manufacturing of mirror blanks. The parts are then used as a basis for the fabrication, using the method described herein, of hexagon sub-assemblies that would then be joined for assembly into mirror blanks. The parts and hexagon sub-assemblies are made of a low coefficient thermal expansion ("LCTE") glass (or glass-ceramic); for example, the low thermal expansion silica-titania glass ULE® glass made by Corning Incorporated or the low thermal expansion glass-ceramic Zerodur® made by Schott Lithotec. The method and apparatus can be used to make honeycomb assemblies for mirror blanks of any size such as those used in astronomical telescopes and other devices. The honeycomb assemblies have hexagonal cells.

The method provides for the laser welding of LCTE glass parts to make hexagonal sub-assemblies suitable for mirrors, said method comprising the steps of:

providing an equilateral triangular LCTE rod of selected length having two end faces and three side faces of selected width that form the equilateral triangular structure, and providing LCTE parts having a length, a width and a thickness, wherein the thickness of the parts is equal to the width of the equilateral triangular side faces and the length of the rod is equal to or larger than the length of the parts;

providing an apparatus having an element for initial holding of the equilateral triangularly shaped rod stationary and a first, a second and a third movable holding fixture each having an element for holding the LCTE glass parts stationary; said element for holding said rod and said first, second and third fixture being mounted on supports such that when said rod is held stationary each of the LCTE glass parts mounted on said first, second and third fixtures can be moved into simultaneous pressured contact with one of the faces of said rod to thereby support the rod and to form a weldable joint between said part and said rod;

removing said rod support after the three LCTE parts are in pressured contact with said LCTE rod;

providing at least one laser for providing a focused laser beam of sufficient power for heating the LCTE glass to its softening point and one or a plurality of mirrors for directing the focused laser beam from the laser to the weldable joint formed by the pressured contact of said LCTE parts with said rod;

moving said fixtures having said parts mounted thereon into a position such that the laser beam reflected by the mirrors impinges on the joint formed by the rod and the piece(s);

moving the pieces simultaneously to weld the parts and the rod together along their length one side;

repositioning the laser beams and moving the pieces to weld the parts and the rod together along the other side to form an equilateral 3-blade propeller-like object;

repeating the foregoing steps a plurality of times to form a plurality of 3-bladed propeller-like object; and forming a hexagonal structure by laser welding the longitudinal thickness face of one blade of each of the 3-bladed propeller-like objects to a longitudinal face of an equilateral triangular LCTE rod. The rod and the glass parts are held in place by clamp element and a vacuum element.

Also provided herein is an apparatus for laser welding of LCTE glass parts, the apparatus comprising:

at least one laser source for producing a laser beam, a first, a second and a third movable fixture for holding LCTE parts having a length, width and thickness, an element for holding an equilateral triangular LCTE rod having a selected length, a plurality of mirrors for reflecting the laser beam from the at least one laser light source to the joints formed by contact between the LCTE parts and the LCTE rod, and a plurality of drive mechanisms to independently moving the first, second and third movable fixture for holding LCTE parts into a position where the parts can be are in pressurized contact with the longitudinal faces of the rod.

DETAILED DESCRIPTION

Herein, low thermal expansion ("LCTE") glasses refers to glasses and glass-ceramics that have an instantaneous coefficient of thermal expansion of $0\pm5\times10^{-7}/°$ C. or less over the approximate temperature range of $-50°$ C. to $+150°$ C. An exemplary LCTE glass that mentioned in the discussions herein is ULE® glass (Corning Incorporated, Corning, N.Y.). Other low thermal expansion glasses and glass-ceramics (collectively herein "LCTE glass") used in conjunction with the method and apparatus described herein. Also herein the LCTE parts are in the form of a glass sheet having a selected length, width and thickness (simply called a "part" or a "sheet"), and a triangular LCTE rod (simply called a "rod"). The parts or sheets are laser welded to the triangular rod to form a 3-blade propeller-like object. Three of these objects are joined by laser to form a hexagonal sub-assembly and a plurality of the hexagonal sub-assemblies that are then joined, using the same laser welding method as described herein, into LCTE mirror blanks. Herein, the term "pressured contact" means that when a surface of one part is brought into contact with a surface of another part a force is exerted on the parts to keep them in contact with one another and/or to hold any object that may be inserted between the parts.

Figure 7:
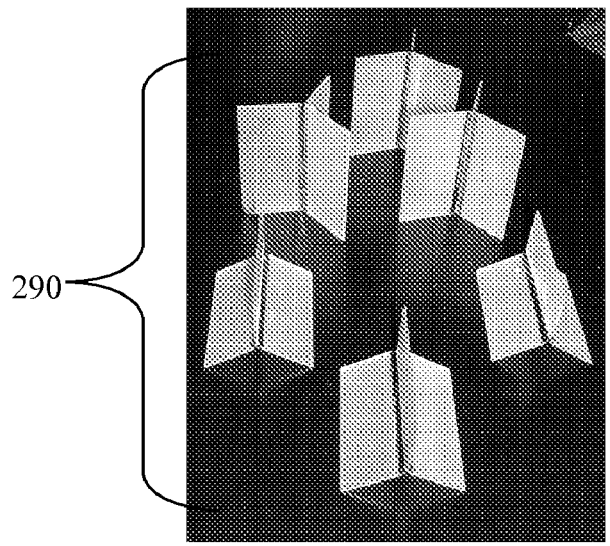
FIG. 7 is a picture illustrating triangular, 3-blade propeller-like objects formed using the method and apparatus described herein.

For exemplary purposes only, the glass pieces used to form the 3-bladed propeller-like objects described herein (and hexagonal sub-assemblies subsequently formed) and illustrated in FIG. 7 had a length l=50 mm, a width w=25 mm and a thickness t=2 mm. The longitudinal faces of the equilateral glass rod used to make the 3-bladed propeller-like structure had a width w=2 mm and a selected length that can be the same as the pieces to which the rod was laser welded or the rod can be slightly longer to accommodate a clamp-type holding device. After the 3-blade propeller-like object is formed the excess glass rod can be removed. The method described herein can be used to make any size parts and hexagonal structure. The apparatus as described herein can be sized as needed to accommodate the dimensions of the parts and rods being used.

There are several important issues to be considered when joining glass components to form larger assemblies. These are:

1. The energy density at the area where the glass pieces are being joined must be carefully controlled in order to avoid localized vaporization of glass material that can result in defects (for example, in optical elements).
2. Residual stress formation must be minimized. Stress in the glass can induce birefringence which can affect the performance of the final product; for example, by causing distortion of any transmitted or reflected light.
3. The area where the pieces are joined (the "joint") together must have high mechanical strength.
4. The surface geometry of the joint must be maintained. For example, the joint should match the geometry of the adjacent glass area and should not have any "defects," for example slumping, that cannot be easily removed such as by grinding, lapping and polishing.
5. When welding glass pieces or parts, as opposed to glass-ceramics, there should be no glass crystallization around the joint when glass pieces are joined together. Crystallization can occur during the sealing or fusing step. Surface crystallization at the joint area is promoted on ground, polished, sawed or otherwise uncleaned surfaces; is very rapid at sealing temperatures; and can prevent good bonding of the parts. Hence, the surfaces should be properly cleaned before being joined; for example, by acid washing.

Large assemblies of LCTE glass have numerous uses where the expansion of the glass can cause errors in observations, for example blurring. In some application it is highly desirable that the LCTE assembly be as light as possible; for example, mirrors and other optical elements that can be used in space or onboard aircraft. It has recently become possible to make small sheets of LCTE glass that be used to make assemblies that can be used in these and other applications. For such uses it is desirable that the assemblies be mechanically and structurally one part, though they have been assembled from a plurality of parts.

Figure 1:
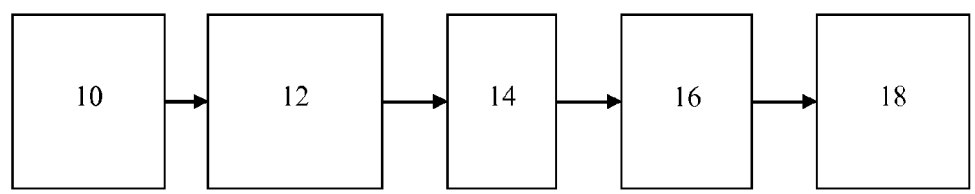
FIG. 1 is a flowchart of the assembly fabrication process that gives a broad overview of the necessary steps to form parts that can be used to make hexagonal sub-assemblies for mirror blank formation.

FIG. 1 is a schematic illustrating the overall steps necessary to make an assembly using the method and apparatus described herein. For example, a ULE® blank 10 is formed, typically as large boule of glass, and is cut to make a "preform" glass sheet 12. The preform glass sheet 12 is then stretched or redrawn to make a stretched glass sheet 14 having a selected length, width and thickness that can vary according to dimensions of the final mirror blank into which the sheet will constitute a part thereof. Stretching can be carried out, for example by without limitation, by heating the glass to approximately the its softening point and then stretching the glass, for example by passing it through a two pairs of rollers operating at different rates of rotation, such that the glass between the pairs of rollers is subjected to a stretching force that causes it to elongate and thin. The elongated glass sheet 14 is cut, sawed, trimmed and otherwise processed if required (for example without limitation ground, polished, lapped, etc., numeral 16) to form the desired sized parts 18. Once the parts have been formed, they are then joined using laser joining or welding as described below.

Figure 2:
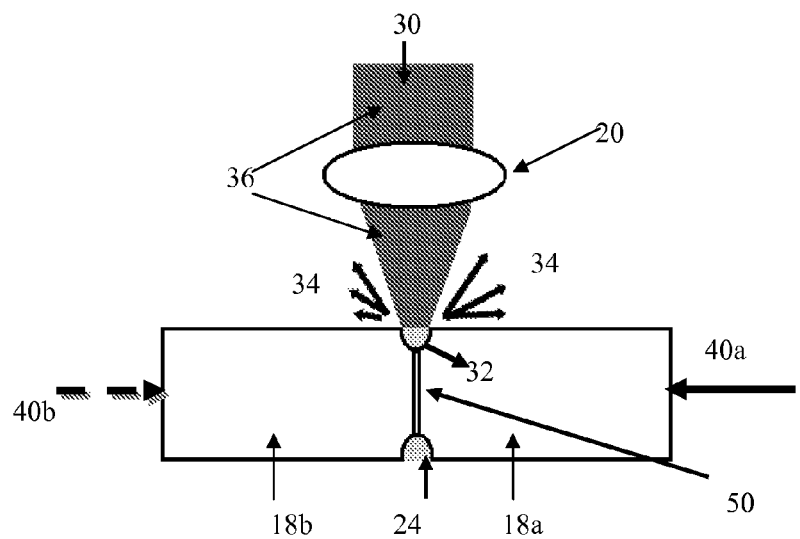
FIG. 2 is a simplified illustration of the joining process and depicts the key elements.

FIG. 2 is simplified side view of the laser joining process that illustrates the key elements involved in the laser welding process. (For simplicity the triangular rod to which the parts will be welded for mirror formation is omitted). Simplified FIG. 2 illustrates two shaped ULE parts or sheets 18 that are to be joined together. The parts are placed in a fixture (not illustrated) having a plurality of elements including first and second elements for holding the first and second ULE parts 18a and 18b. In one embodiment, the second part 18b is held stationary and the first part 18a is in a movable fixture element, and the first part 18a is pressed against second part 18b by applied pressure as illustrated by arrow 40a such that the pressure being applied is uniform across the interface between the two parts which is indicated by numeral 50 and the parallel lines extending from top to bottom of the parts). In a second embodiment, parts 18a and 18 are both placed in a movable fixture and pressure is applied as indicated by arrows 40a and 40b such that the pressure being applied is uniform across the interface between the two parts being pressed together. A laser unit (not illustrated) generates a laser beam 30 that passes through focusing lens 20 that focuses the beam. [The energy density of the beam is increased after being focused since energy density for a beam of given power is a function of the beam's radius.] The focal point of the beam is a point 32 where the ULE glass is heated by Q conduction; that is, the quantity ("Q") of heat transferred by conduction into the glass. The joining of the glass illustrated in FIG. 2 is accomplished continuous welding by either moving the laser (with the parts and the fixtures holding them held stationary) at a constant rate from one side of the parts to the other (from back to front in the figure) as represented by numeral 32, or by moving the parts (and the apparatus or elements on which they are situated) in a continuous manner with the laser beam held stationary. Continuous welding, which is done at a constant power and traversal rate, is preferred to spot welding even if the spots are contiguous because it minimizes the number of potential flaw sites that can be associated with spot welds, particularly when multiple spot welds are used. Arrows 34 represent the quantity Q of heat lost by convention and radiation. Numeral 24 represents a second weld made using a second laser that would be located under the parts as illustrated or, after the joining at points 32 has been completed, turning the parts over and repeating the operation in the same manner as described above. In preferred embodiments both parts 40a and 40b are movable and two lasers are used simultaneously.

Figure 3:
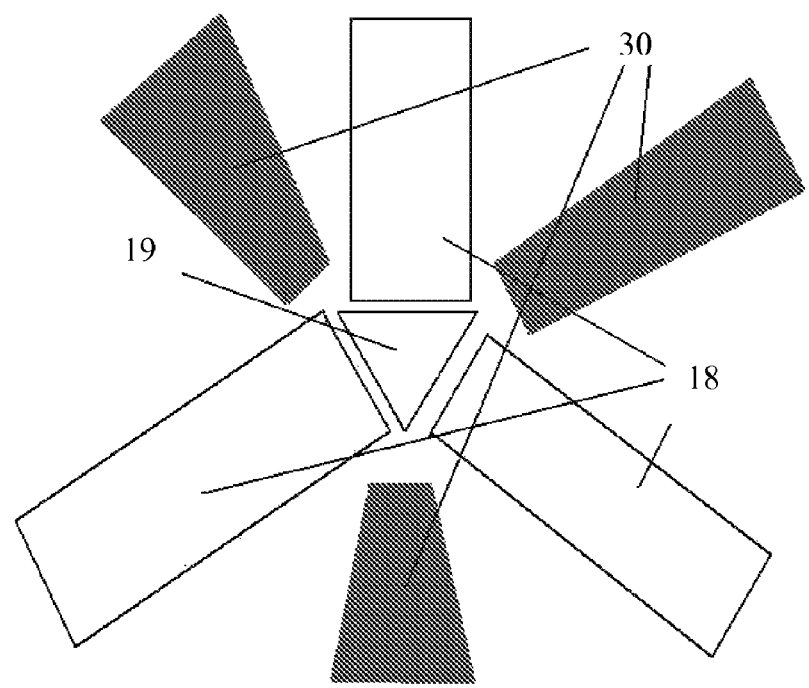
FIG. 3 is an illustration of LCTE glass pieces in the process of being joined to a triangular LCTE rod by a laser beam to form parts that will then be used to make a hexagon sub-assembly.
Figure 4:
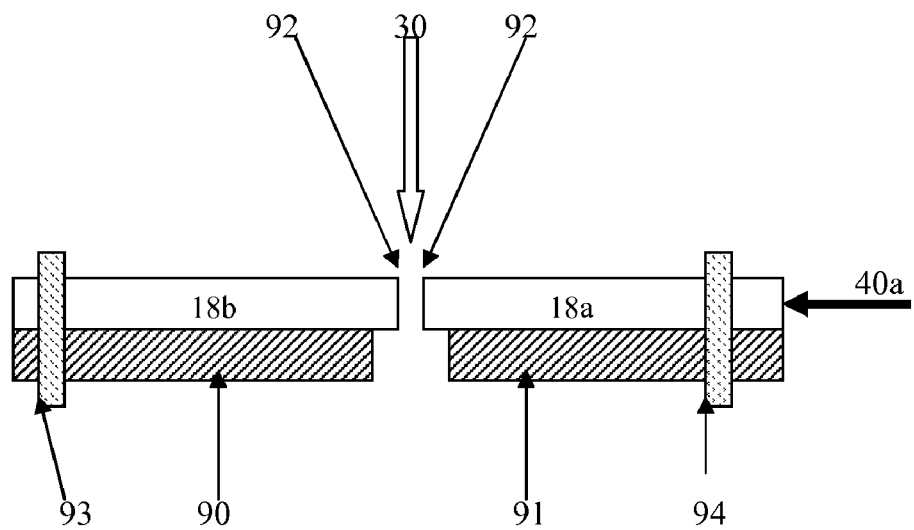
FIG. 4 is an illustration of LCTE pieces on movable fixtures in the process of being moved for joining by the use of a laser beam.

FIG. 3 is an illustration of showing three ULE parts 18 being welded to a central equilateral triangular rod 19 by laser beams 30 to form a triangular, 3-blade propeller-like piece in which there is an angle θ=120° between parts. In one embodiment the beams 30 can be from three separate lasers so that the welding of the three parts 18 to rod 19 can be conducted simultaneously. In another embodiment one laser can be used to successively weld parts 18 to rod 19. The use of multiple lasers as illustrated is preferred because it minimizes the movement of laser equipment or the parts and the fixture holding the parts that would occur when a single laser is used. After welding as indicated a single, 3-bladed propeller-like object 290 as illustrated in FIG. 7 is formed in which there is an angle θ=120° between the welded parts. The void area between parts 18 of an object 290 can be filled using appropriately sized equilateral triangular parts of ULE glass to make a hexagonal structure. In an alternative, three of the propeller-like objects 290 can be joined to form a hexagonal sub-assembly. A plurality of the hexagonal sub-assemblies can be joined together using additional objects 290 to form a honeycomb structure having a plurality of hexagonal cells. In another alternative a plurality of objects 290 can be sequentially joined to form a sequence of adjacent hexagonal cells such that the result is a honeycomb structure having a plurality of hexagonal cells. Using objects 290, the laser welding method described herein, and the apparatus also described herein the honeycomb structure can be made to any selected size. After the selected honeycomb size has been reached, any "parts 18 that are not part of a hexagon can be removed; for example by cutting, sawing or grinding. When the honeycomb has been completed, hexagonal pieces of LCTE glass can be inserted into the honeycomb's hexagons to form, for example, a mirror blank FIG. 4 is a diagram illustrating some essential elements for laser joining or welding of a LCTE glass, for example, ULE® glass. FIG. 4 illustrates parts 18a, 18b on laser worktable fixture (100, not fully illustrated) that has movable elements 90 and 91. As illustrated the parts 18a, 18b are held in place by clamps 93, 94 that extend from the bottom of elements 90, 91 to the top of parts 18a, 18b to hold the parts in place on elements 90, 91 while parts are in the process of being laser joined. In an alternate embodiment, in the place of clamps 93, 94, elements 90, 91 have openings therethrough (not illustrated) for the application of vacuum from a vacuum source (not illustrated) to hold parts 18a, 18b in place. In one embodiment both worktable elements 90, 91 are movable. In another embodiment one worktable element (for example, element 90) is not movable and the other element (for example, element 91) is movable. Workpieces 18a, 18b each extends a distance from the edge of elements 90, 91 toward each other. The arrow 92 points to the areas of parts 18a, 18b that will be joined by using a laser beam 30, together with pressure exerted as element 91 as it moves toward element 90 in the direction indicated by arrow 40a, to heat and join parts 18a and 18b. Laser radiation (the laser beam) is typically applied to the area denoted by 92 after the parts 18a, 18b are in contact with one another and before the laser begins to traverse and seal the point of contact area to form a joint. No additional pressure/movement is required after initial pressure loading. The drive mechanism(s) for moving elements 90, 91 having parts 18a, and 18b thereon is not illustrated. Mechanisms for moving and pressing parts together are well known in the mechanical arts.

Figure 5:
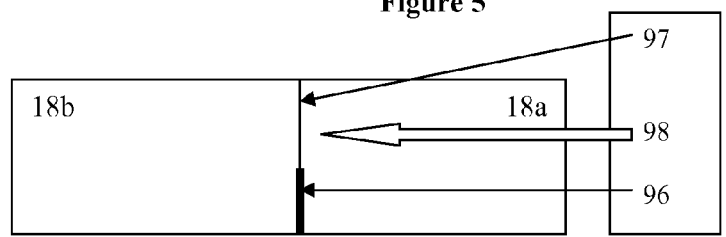
FIG. 5 is a further illustration LCTE parts being joined by a laser.

FIG. 5 is shows parts 18a, 18b in a top view illustrating a partially completed laser welding process. The heavy line 96 signifies an area that has been joined together by laser radiation 30 (not illustrated) and the lighter line 97 signifies the area that is in the process of being, and will be, joined by laser radiation 30 as it traverses the area signified by lighter line 97. Using a one-laser system, when the welding of the top has been completed the parts 18a, 18b can be turned over and the process repeated on the second side of the part to complete the joining process. In an alternate embodiment top and bottom joint areas are welded simultaneously using two laser systems. In order to fuse LCTE parts to one another the laser system used to weld LCTE glass must be of sufficient power and have a wavelength that can be absorbed by the LCTE glass. That is, the laser must be capable of heating the glass to at least the softening point of the glass so that the glass will flow together to form a joint or weld. For a LCTE glass such as fused silica, HPFS® (Corning Incorporated, registered mark for high purity fused silica) or ULE glass a $CO_2$ laser system is suitable and commercially available. Silica LCTE glasses have good properties for laser melting and machining which result from the strong absorption of $CO_2$ laser light, which gives a small melt depth, and the LCTE glass' low thermal expansion. For example, a $CO_2$ laser was used herein to join ULE glass as illustrated in FIG. 3 to form a 3-bladed propeller like object 290 as shown in FIG. 7 which was then filled in with triangular parts of ULE glass, laser welded to object 290, to form a hexagon for use in a telescopic mirror. The $CO_2$ lasers can provide power in the range of 50 to 15,000 watts which assures that sufficient power is available to weld high softening point glasses such as ULE glass which has a softening point of approximately 1490° C. or HPFS which has a softening point of 1585° C. The laser must be able to heat the glass to the softening point so that it flows and joints together the parts being welded.

Figure 6:
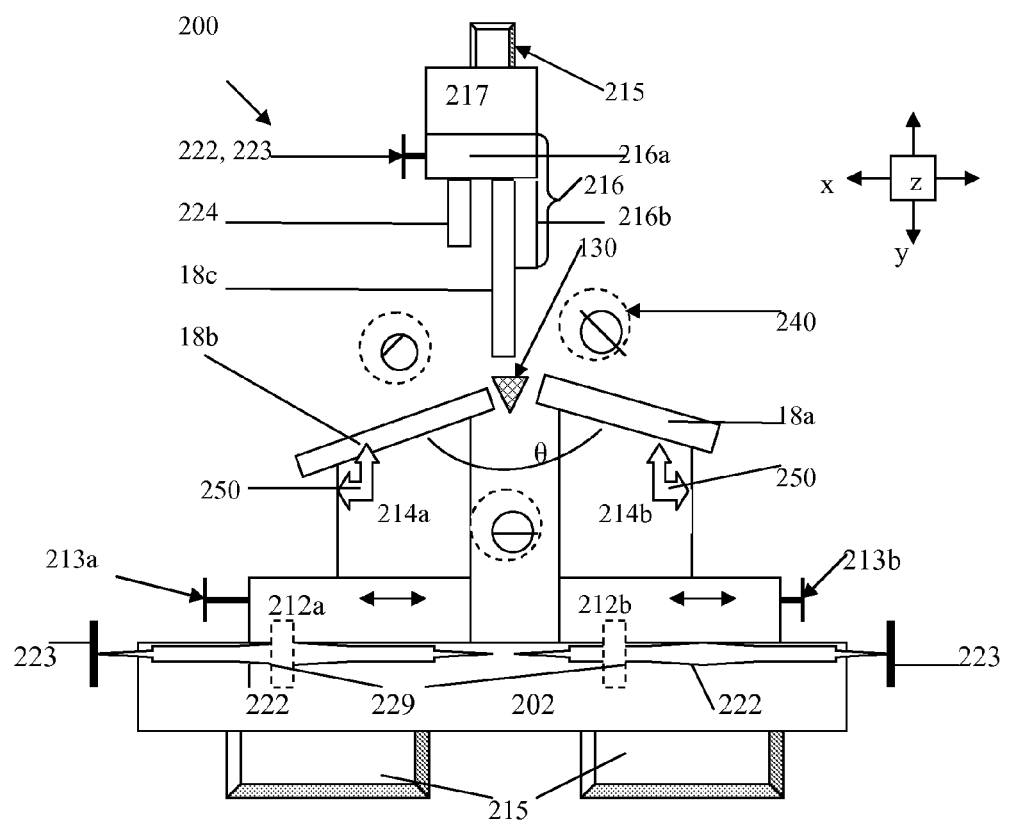
FIG. 6 is an illustration of an apparatus at can be used to join LCTE pieces to a triangular rod to make triangular parts for assembly into hexagonal sub-assemblies.

FIG. 6 is a top view illustrating an apparatus 200 that can be used to weld LCTE parts to a LCTE rod to form an assembly that can be used making mirrors. Axial directions are shown in the upper right hand corner of the figure to illustrate that the horizontal x-, y-axes are in the plane of the drawing and the vertical z-axis is in-and-out of the plane of the paper. Broadly, the apparatus consists of movable fixtures 217, 212a and 212b, each of which has elements as described, and a plurality of mirrors 240 for reflecting laser light from a laser light source to the points where LCTE parts 18 are in contact with a LCTE rod 130 (for example without limitation, a triangular rod as might be used in the making for a honeycomb structure for large telescope) to which parts 18 will be joined to form an assembly used in making a mirror. Movable fixture 217 is mounted on a support 215 such that it is movable (manually or by computer control) along support 215 which is partially illustrated behind 217. Element 216 is an "L" shaped element having a leg 216a rigidly attached to fixture 217 and a rigid, non-movable leg 216b that is perpendicular to and extends outwardly from leg 216a. During laser welding a laser part 18c is held in position between element 216 leg 216b and a movable holding element 224. Within element 216 leg 216a is a track and a rotatable worm screw drive 222 (not illustrated) with attached external wheel 223 that can be rotated either clockwise or counterclockwise. Holding element 224 extends within leg 216a and element 224 has a threaded opening that meshes with worm drive 222 threads such that element 224 can move along the worm drive and the track in either direction depending on the rotational direction of drive 222. For example, clockwise rotation may move element 224 toward the leg 216b of and counterclockwise rotation may move it away from leg 216b. Rotation of element 223, and the attached worm drive, can be done by manually turning wheel 223 or by connecting wheel 23 to a drive motor and controller. In use, a LCTE part 18c is placed against element 216 leg 216b and element 224 is moved along worm drive 222 until it contacts part 18c with sufficient pressure to hold part 18c in place.

Base 202 is a base that can be either fixed to openings on support 215 (for example, by using nuts and bolts), or a movable base mounted on support 215 that is either manually moveable or movable by a drive motor connected to a controller. Within base 202 are mounted two independently rotatable worm screws drives 222 with attached external wheels 223 such that drives 222 can be rotated either clockwise or counterclockwise to independently move bases 212a and 212b either toward one another or away from one another. Bases 212a and 212b are connected to drives 222 by elements 229, shown as dotted line rectangles, which extend from bases 212a and 212b into base 202. Elements 229 have a threaded opening through which drives 222 pass with the threads of the worm drive engaging the threads of the opening. As drives 222 are rotated elements 229 are moved along the drive thus moving fixtures 212a and 212b.

Elements 214a and 214b are mounted on fixtures 212a and 212b. Elements 214a and 214b can be either fixed or movable. If elements 214a and 214b are movable, the worm drives used to move them can be located within elements 214a and 214b, respectively (not illustrated), or they can be located within elements 212a and 212b, respectively, as illustrated by the arrows pointing to external wheels 213a and 213b what are used to rotate the worm drive. Wheels 213a and 213b can be turned either manually or using a drive motor and controller. Elements 214a and 214b are connected to the worm drives within elements 212a and 212b in the same manner as elements 214a and 214b are connected to worm drives 222 in base 202.

Elements 214a and 21b each has a sloped top such that the angle θ between the sloped tops and the LCTE pieces 18a and 18b thereon is 120°. LCTE pieces 18a and 18b are held in place on the sloped tops by a holding element (not illustrated) or by vacuum illustrated within elements 214a and 214b by the block arrows 250 representing the connection between multiple vacuum ports in elements 214a and 214b and a vacuum source (not illustrated).

The apparatus 200 also has a plurality of movable mirrors 240 that are represented by a circle-and-line within a dotted line circle. In the embodiment as illustrated three lasers are used for welding each of parts 8a, 18b and 18 to rod 130. Mirrors 240 are transmit a focused laser beam from a laser source used to joints formed by 18a, 18b and 18 with rod 130.

Further referring to FIG. 6, to form triangular parts suitable making hexagonal sub-assemblies, LCTE parts 18a, 18b and 18c are placed and held as described. The triangular parts are made using three LCTE glass pieces and a triangular LCTE glass rod. Triangular rod 130 is held in position at either end by a holding element (not illustrated), for example a clamp or a vacuum element in contact with the end faces of rod 130. Once the rod is in position each of the parts 18a, 18b and 18c is moved into pressured contact with a face of the triangular rod. Once all the parts 18a, 18b and 18c are in pressured contact with rod 130, the rod 130 holding elements can be removed and the joints between the rod and parts 18a, 18b and 18c are joined using the transmitted laser beam. When a clamp is used the rod length is greater than that of parts 18a, 18b and 18c to facilitate use of the clamp. When a vacuum element is used to hold the rod the vacuum element can be removed once the rod and parts 18a, 18b and 18c are in pressured contact. Consequently, when vacuum is used to hold rod 130, the rod can be the same length as the faces to which it is being welded or it can be longer. However, regardless of how the rod is held and the allowance that the length of the rod can be slightly longer than the length of the glass face to which it is being welded, the width of the rod faces and the glass faces being welded to the rod faces must be the same. When welding has been completed the welded parts are removed and any excess length of rod 130 is removed, for example by cutting. The resulting triangular, 3-blade propeller-like objects 290 made using the method and apparatus described herein are illustrated in FIG. 7.

Figure 8A:
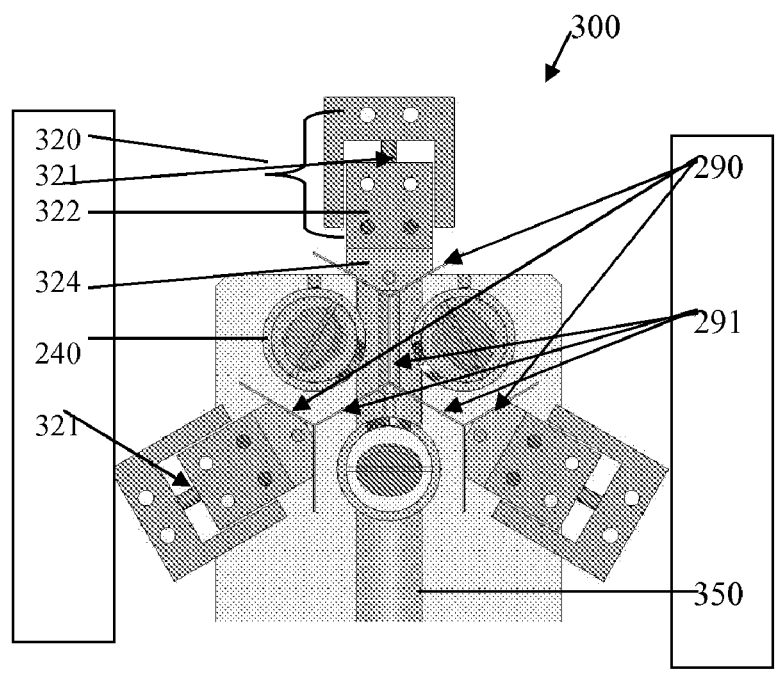
FIG. 8A is an illustration of equilateral triangular parts in the process of being made into a hexagon sub-assembly.
Figure 8B:
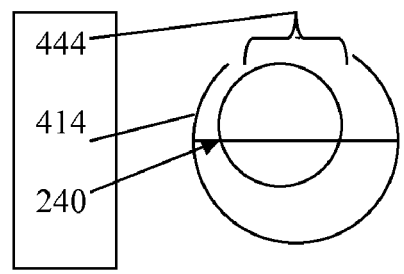
FIG. 8B is an illustration showing a mirror assembly within a tube that has an opening for directing a laser beam from a laser beam source to the joint that is to be welded.

FIG. 8A illustrates the process of making a hexagonal sub-assembly. In FIG. 8A the apparatus 300 has heads 320 that are mounted on a frame. Each head 320 has a movable element 322 with vacuum head 324 for holding a triangular, 3-bladed propeller-like part 290 in place by application of vacuum to two of the three blades. Elements 322 with vacuum heads 324 and attached parts 290 are moved toward one another by piston 321 until the blades 291 not held by vacuum heads 324 each makes pressured contact with a triangular rod 130 as in FIG. 7, though not illustrated in FIG. 8A. (Rod 130 maybe held in place by a removable holder, as described above, until pressured contact is made with blades 291). The blades 291 are then welded or joined to rod 130 using laser beams 30 (not shown) reflected by mirrors 240 to the joints being welded. As illustrated in FIG. 8B, each mirror 240 is within a tube 414 that has an opening 444. Laser light is reflected from minor 240 through tube 414 opening 444 to the joint locations. In a preferred embodiment three laser beam 30 are used to simultaneously weld the three parts together. The parts 290 being welded are stationary and the laser beams traverse the elements as is illustrated in FIGS. 9 and 10.

Figure 9:
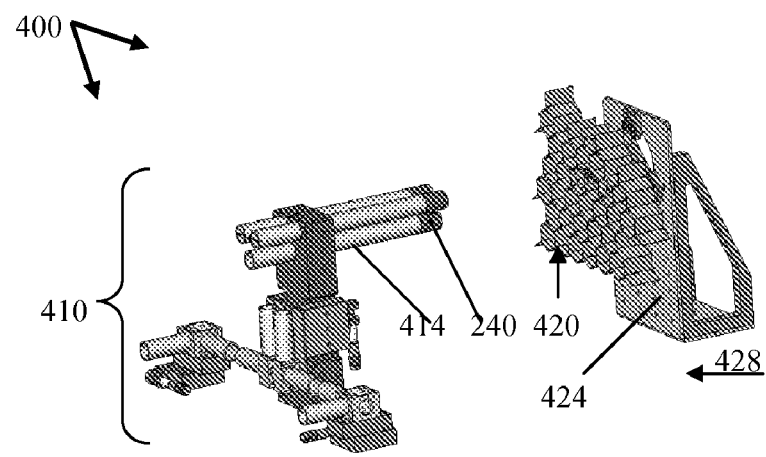
FIG. 9 illustrates a honeycomb structure in the process of being assembled an apparatus having mounted thereon three tubes for reflecting laser beams.
Figure 10:
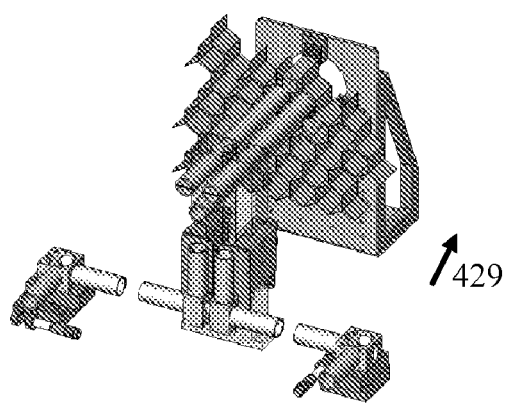
FIG. 10 illustrates how the tubes containing mirrors for reflecting a laser beam are positioned such that the laser beam can begin welding from the "back" of a cell of a honeycomb structure to the "front" of the cell by movement of the stand in the direction indicated by the arrow in FIG. 10.

FIG. 9 illustrates apparatus 410 having mounted thereon three tubes 414. Each tube 414 has a mirror 240 at one end and an opening 444 as is illustrated in FIG. 8B. Apparatus 410 is mounted on supports 416 and is not moved during laser welding. A partially completed honeycomb 420 is mounted on a movable stand 424 having holding element as described in FIG. 8A. Welding is carried out by moving support 424 with honeycomb 420 thereon in the direction indicated by arrow 428 until the end of tubes 414 are within adjacent hexagonal or partial opening of honeycomb 414 as is illustrated in FIG. 10, and the openings in tubes 414 are positioned such that the laser beam can begin welding from the "back" of the honeycomb (the part closest to support 424) to the "front" of the honeycomb by movement of the stand in the direction indicated by arrow 429 in FIG. 10. The process can be repeated as many times as necessary to form a completed honeycomb structure.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

We claim:

1. A method for laser welding of LCTE glass parts to make hexagonal sub-assemblies suitable for mirrors, said method comprising the steps of:
    providing an equilateral triangular LCTE rod of selected length having two end faces and three side faces of selected width that form the equilateral triangular structure, and providing LCTE parts having a length, a width and a thickness, wherein the thickness of the parts is equal to the width of the equilateral triangular side faces and the length of the rod is equal to or larger than the length of the parts;
    providing an apparatus having an element for initial holding of the equilateral triangularly shaped rod stationary and a first, a second and a third movable holding fixture each having an element for holding the LCTE glass parts stationary; said element for holding said rod and said first, second and third fixture being mounted on supports such that when said rod is held stationary each of the LCTE glass parts mounted on said first, second and third fixtures can be moved into simultaneous pressured contact with one of the faces of said rod to thereby support the rod and to form a weldable joint between said part and said rod;
    removing said rod support after the three LCTE parts are in pressured contact with said LCTE rod;
    providing at least one laser for providing a focused laser beam of sufficient power for heating the LCTE glass to its softening point and one or a plurality of mirrors for directing the focused laser beam from the laser to the weldable joint formed by the pressured contact of said LCTE parts with said rod;
    moving said fixtures having said parts mounted thereon into a position such that the laser beam reflected by the mirrors impinges on the joint formed by the rod and the piece(s);
    moving the pieces simultaneously to weld the parts and the rod together along their length one side;
    repositioning the laser beams and moving the pieces to weld the parts and the rod together along the other side to form an equilateral 3-blade propeller-like object;
    repeating the foregoing steps a plurality of time to form a plurality of 3-bladed propeller-like object; and
    forming a hexagonal structure by laser welding the longitudinal thickness face of one blade of each of the 3-bladed propeller-like objects to a longitudinal face of an equilateral triangular LCTE rod.

2. The method according to claim 1, wherein the element for holding the holding the rod and the glass parts is a vacuum element.

3. The method according to claim 1, wherein LCTE glass parts means glass parts having a coefficient of thermal expansion of $0\pm5\times10^{-7}$ or less over the approximate temperature range of $-50°$ C. to $+150°$ C.

4. The method according to claim 1, wherein said LCTE glass parts are selected from the group consisting of fused silica and silica-titania.

5. The method according to claim 1, wherein said "at least one laser" is capable of heating the glass to the softening point of the glass so the glass will flow together to form a joint or weld.

6. The method according to claim 1, wherein said "at least one laser" is a $CO_2$ laser providing power sufficient power to weld the glass parts together.

* * * * *